PUSH-PULL MAGNETIC AMPLIFIER AND CIRCUITS THEREFOR

Filed June 16, 1954 2 Sheets-Sheet 1

INVENTOR:
Michel Mamon
BY
Karl F. Ross
AGENT.

Feb. 23, 1960 M. MAMON 2,926,300

PUSH-PULL MAGNETIC AMPLIFIER AND CIRCUITS THEREFOR

Filed June 16, 1954 2 Sheets-Sheet 2

Michel Mamon
*INVENTOR.*

*BY*

AGENT.

United States Patent Office 2,926,300
Patented Feb. 23, 1960

2,926,300

PUSH-PULL MAGNETIC AMPLIFIER AND CIRCUITS THEREFOR

Michel Mamon, New York, N.Y., assignor of forty percent to George A. Rubissow, New York, N.Y., and sixty percent to Magnetic Precision Controls Inc., New York, N.Y., a corporation of New York Application June 16, 1954, Serial No. 437,267

5 Claims. (Cl. 323—89)

This invention relates to magnetic amplifiers of duodirectional type, the output being proportioned to the input and having its polarity reversing when the input polarity is changed. Similar magnetic amplifiers have been described in my co-pending patent applications Ser. No. 366,-161, filed July 6, 1953; Ser. No. 385,580, filed October 12, 1953; Ser. No. 401,553, filed December 31, 1953; and Ser. No. 402,070, filed January 4, 1954.

In herein illustrated figures and in the description the examples given do not limit this invention thereto, and like references refer to like meanings.

This invention will be more fully understood and apprehended by the four typical systems and apparatus used as herein described and illustrated in the appending Figures 1 through 4, however, these examples herein given do not limit this invention thereto.

Figure 1:
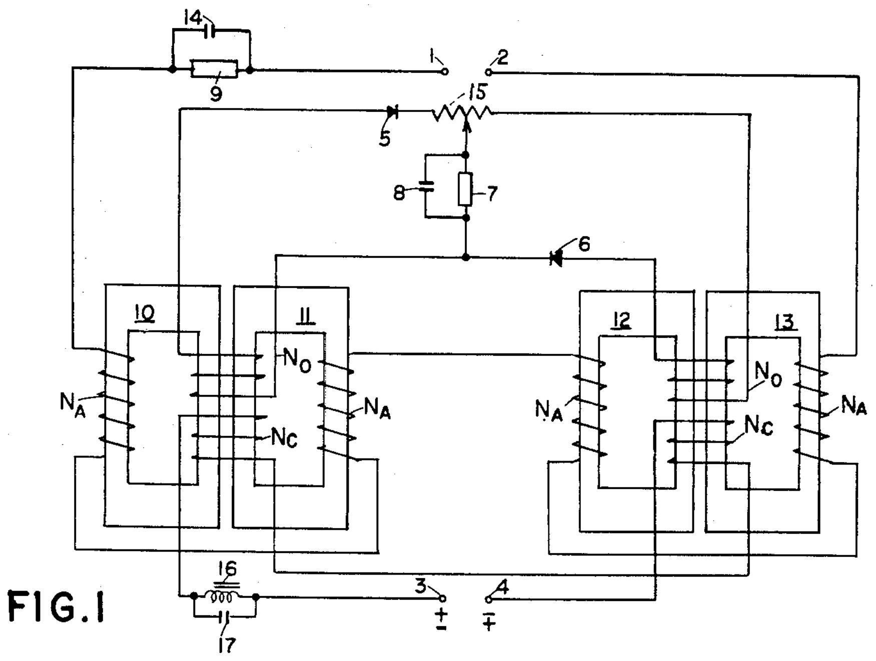

In Figure 1, one aspect of this invention is shown, which is suitable for voltage or current measurement, from thermocouples, strain gauges, current shunts, photo voltaic cells, etc. The circuit of Figure 1 comprises four saturable magnetic cores 10, 11, 12 and 13; each pair of said cores constitutes an individual amplifier which will be designated here as amplifier I (cores 10 and 11) and amplifier II (cores 12 and 13).

These cores, 10 and 11, 12 and 13, are of high permeability magnetic material, preferably closely matched in pairs; each core is wound with equally rated primary winding $N_A$ interconnected in series opposing; a common control winding $N_c$ wound around both cores 10 and 11 or 12 and 13; a common output winding $N_o$, wound around both cores 10 and 11 or 12 and 13. On Figure 1, which shows one aspect of the present invention, primary windings $N_A$ of amplifiers I and II are interconnected in series to an A.C. source through a current limiting resistor 9, shunted preferably by a capacitor 14. The magnitude of the A.C. source voltage between terminals 1 and 2 is such as to exceed the saturation voltage of amplifiers I and II. Control coils of amplifiers I and II are interconnected in series opposing to a D.C. signal source between terminals 3 and 4. In some applications when the signal source between terminals 3 and 4 is of low internal impedance it is preferable to insert in series with the control coils $N_c$ an appropriate inductance 16 preferably shunted by an appropriate capacitor 17, which capacitor improves the transient response of the amplifiers subject to this invention.

Output windings $N_0$ of individual amplifiers I and II are interconnected in series aiding to half-wave rectifiers 5 and 6; a common load 7 shunted preferably by a capacitor 8 between positive terminals of rectifiers 5 and 6. Thus a push-pull amplifier of reversing output polarity is provided with reversing input signals. In order to achieve a perfect balance, i.e., zero output with zero signal, a small adjustable resistor 15 may be used according to Figures 1 and 2: this adjustable resistor 15 can take care of slight differences in rectifiers 5 and 6, cores 10 and 11, and 12 and 13. The capacitor 14 increases the gain of the amplifiers according to Figures 1, 2, 3, and 4 subject to this invention. The proper operation of circuits 1, 2, 3, and 4 is achieved only when the A.C. supply voltage between terminals 1 and 2 has a value such that the current flowing in windings $N_A$ will exceed the saturation current of the cores of amplifiers I and II connected in series as on Figure 1.

Figure 2:
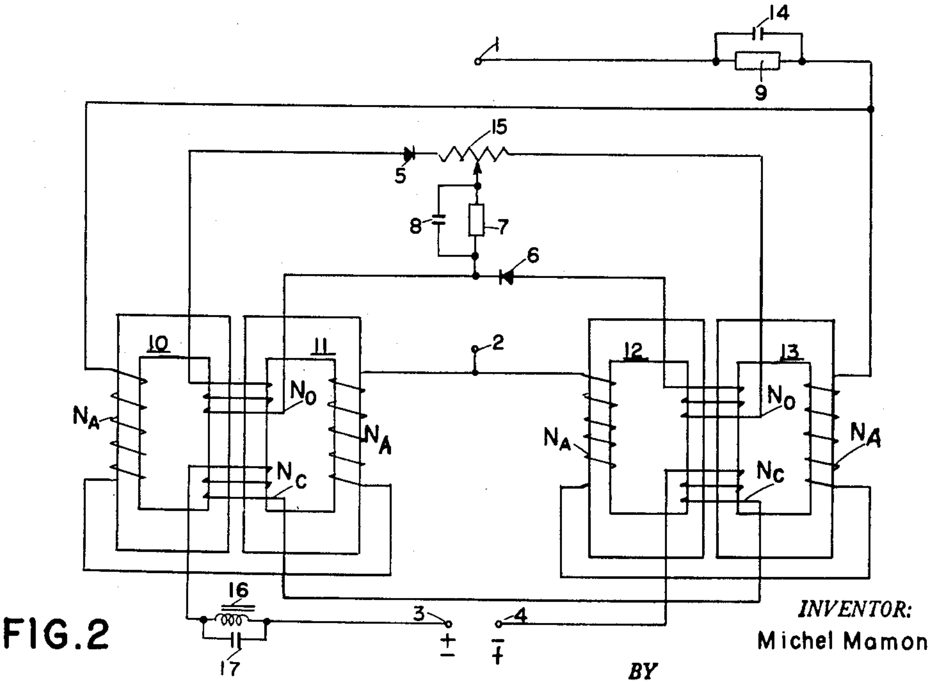

Another aspect of this invention is shown in Figure 2 wherein the primary windings $N_A$ of individual amplifiers I and II are interconnected in parallel to the A.C. source 1 and 2 through current limiting resistor 9 shunted preferably by capacitor 14.

The mode of operation of the amplifier of Figure 2 is exactly the same as previously described according to Figure 1.

Figure 3:
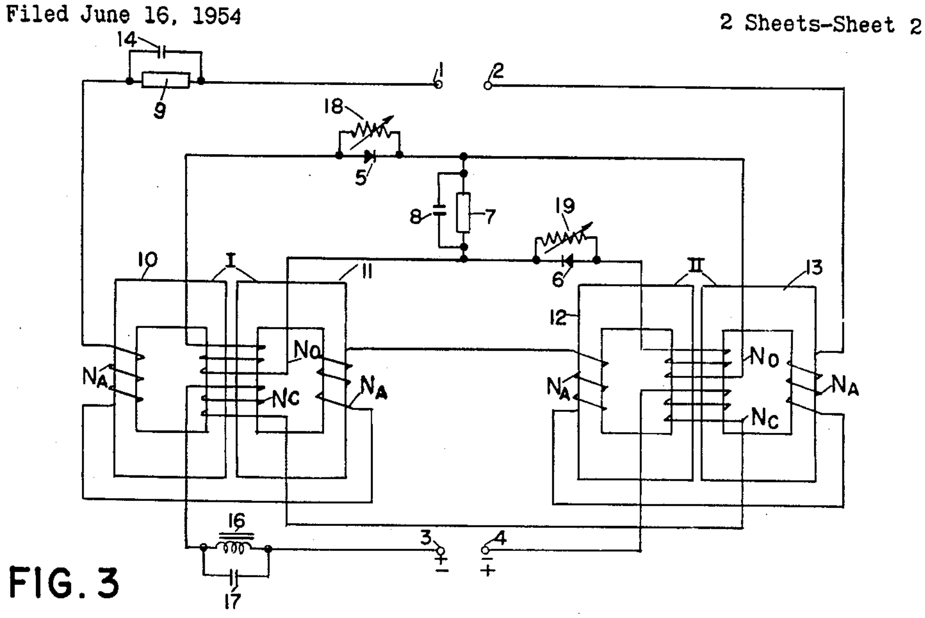

Still another aspect of this invention of the push-pull amplifier is shown in Figure 3 wherein another means to balance the output null is provided: by shunting one or both half-wave rectifier elements 5 and 6 by an appropriate resistor 18 or 19. The value of this resistor must be high comparatively to the forward resistance of the rectifiers. In all other aspects the push-pull amplifier shown on Figure 3 is similar to the one shown on Figure 1.

Figure 4:
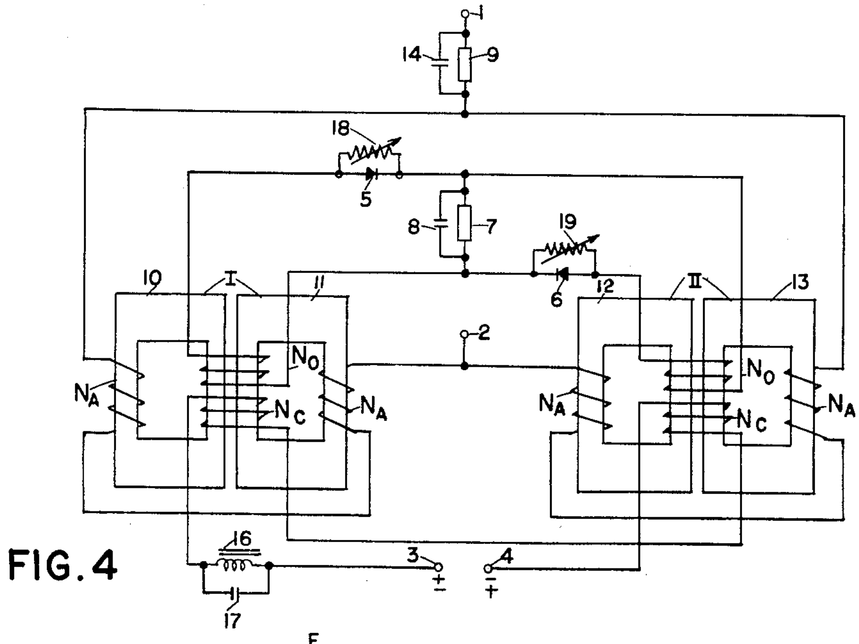

Figure 4 shows another aspect of a push-pull magnetic amplifier according to the present invention wherein the circuit of Figure 4 is similar to the one shown on Figure 2, with the difference that here to provide the perfect zero output with no signal applied to terminals 3 and 4 the rectifier elements 5 and 6 are shunted by resistors 18 and 19, as on Figure 3.

Figure 5:
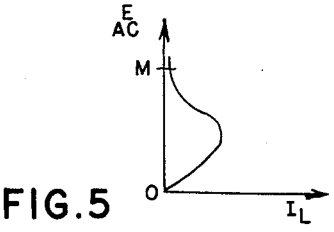

The proper value of the A.C. voltage to be applied to terminals 1 and 2 is selected in the following way: Signal source being connected to terminals 3 and 4 but not energized, the line voltage is increased from zero and the output current in the load 7 is observed on the ammeter: this current follows the path of the curve shown on Figure 5. In the neighborhood of the point "M" on the voltage axis the output current is a minimum and the amplifiers according to Figures 1, 2, 3, and 4 subject to this invention have an optimum performance, i.e., high gain, high stability, minimum time constant. The working A.C. voltage "OM" on the Figure 5 is the optimum voltage to be applied to the amplifiers of Figures 1, 2, 3 and 4 subject to this invention. This value of A.C. voltage is always greater than the saturation voltage of the amplifiers, subject to this invention. For this reason, in order to limit the current flowing through primary windings a current limiting resistor 9 is always used, in connection with the push-pull amplifier subject of this invention.

Another feature of this invention consists of the following: The higher the internal impedance of the signal source, the higher the A.C. voltage to be applied to the push-pull amplifier will be, subject to this invention. For example, the ratio of A.C. voltages to be applied to the circuits of Figures 1, 2, 3 and 4 when the signal source is a thermocouple and a photovoltaic cell is in the order of 2/3.

It is to be noted that the performance characteristics of push-pull magnetic amplifiers according to Figures 1, 2, 3 and 4 subject to the present invention remain unchanged if the control windings $N_c$ of amplifiers I and II are interconnected in series aiding and output windings $N_o$ of amplifiers I and II are interconnected in series opposing.

What I claim is:

1. A push-pull magnetic amplifier comprising two pairs of saturable cores each including a first and a second core, a source of alternating driving voltage, a first and a second primary winding on said first and said second core of each pair, respectively, said primary windings being connected in series with each other across said source, said source having an output of an amplitude sufficient to saturate said cores over a substantial portion of each cycle, resistance means connected in series with said source of driving voltage and said primary windings, a source of signal voltage, a first and a second control winding on said first and said second core of each pair, respectively, said control windings being connected in series with each other across said source of signal voltage, a first and a second output winding on said first and said second core of each pair, respectively, said output windings being connected in series with each other in the same sense as said control windings and in a sense opposite to that of said primary windings, an output circuit serially including said output windings of both pairs of cores, said output circuit being insulated from all other of said windings, first rectifier means inserted in one branch of said output circuit between said first output windings, second rectifier means inserted in the same sense as said first rectifier means in another branch of said output circuit between said second output windings, and a load connected between terminals of like polarity of said first and second rectifier means, said load being bridged across the output windings of both pairs of cores in parallel.

2. A magnetic amplifier according to claim 1, including condenser means bridged across said resistance means.

3. A magnetic amplifier according to claim 1, further comprising inductance means in series with said source of signal voltage.

4. A magnetic amplifier according to claim 3, further comprising capacitance means bridged across said inductance means.

5. A magnetic amplifier according to claim 1, further comprising other resistance means in said output circuit connected in part between said load and one of said rectifier means, said load having a terminal connected to an intermediate point of said other resistance means.

References Cited in the file of this patent

UNITED STATES PATENTS

| | | |
|---|---|---|
| 2,108,642 | Boardman | Feb. 15, 1938 |
| 2,164,383 | Burton | July 4, 1939 |
| 2,475,575 | Tweedy | July 5, 1949 |
| 2,657,281 | Kluz | Oct. 27, 1953 |
| 2,677,796 | Geyger | May 4, 1954 |

OTHER REFERENCES

Reyner: "The Magnetic Amplifier," publ. by Rockliff Publ. Cor., Ltd., London, England, 2nd ed., 1953; pp. 37–41, particularly Fig. 23.

German publication—"Sonderdruk aus Wissenschaftliche Veroffentlichungen aus den Siemens-Werken," XIX Band, 3 Heft; pp. 231–232, Figs. 4 and 5; which is in the following article—Geyger—"Grundlagen der magnetischen Verstarker für die Mess—und Regeltechnik" (p. 9 of article).